United States Patent
Ozaki

[11] Patent Number: 6,151,151
[45] Date of Patent: Nov. 21, 2000

[54] SCANNER USING A POLYGONAL MIRROR

[75] Inventor: Shinichi Ozaki, Kanagawa, Japan

[73] Assignee: Ricoh Company, Ltd., Tokyo, Japan

[21] Appl. No.: 09/321,125

[22] Filed: May 27, 1999

[30] Foreign Application Priority Data

May 27, 1998 [JP] Japan .................................. 10-146063

[51] Int. Cl.⁷ .................................................. G02B 26/08
[52] U.S. Cl. .......................... 359/200; 359/198; 359/216
[58] Field of Search ..................... 359/198, 200, 359/216–219, 850, 855, 871, 872; 310/40 R, 66, 68 R, 90, 90.5

[56] References Cited

U.S. PATENT DOCUMENTS 4,836,631  6/1989  Shimazu et al. ..................... 359/218

FOREIGN PATENT DOCUMENTS 62-164017  7/1987  Japan .
9-230269   9/1997  Japan .

*Primary Examiner*—James Phan
*Attorney, Agent, or Firm*—Oblon, Spivak, McClelland, Maier & Neustadt, P.C.

[57] ABSTRACT

A scanner using a polygonal mirror includes a rotor with a magnet mounted thereon, a rotary shaft on which the rotor is mounted, and a stator with a coil facing the magnet at a preselected distance. The rotor is machined in the form of a square pillar having mirror surfaces at sides thereof to thereby form the polygonal mirror. A recess is formed in one major surface of the rotor while the magnet is press fitted in the recess. The scanner with this configuration needs a minimum number of parts, obviates the need for highly accurate adhesion and is durable and easy to produce.

6 Claims, 6 Drawing Sheets

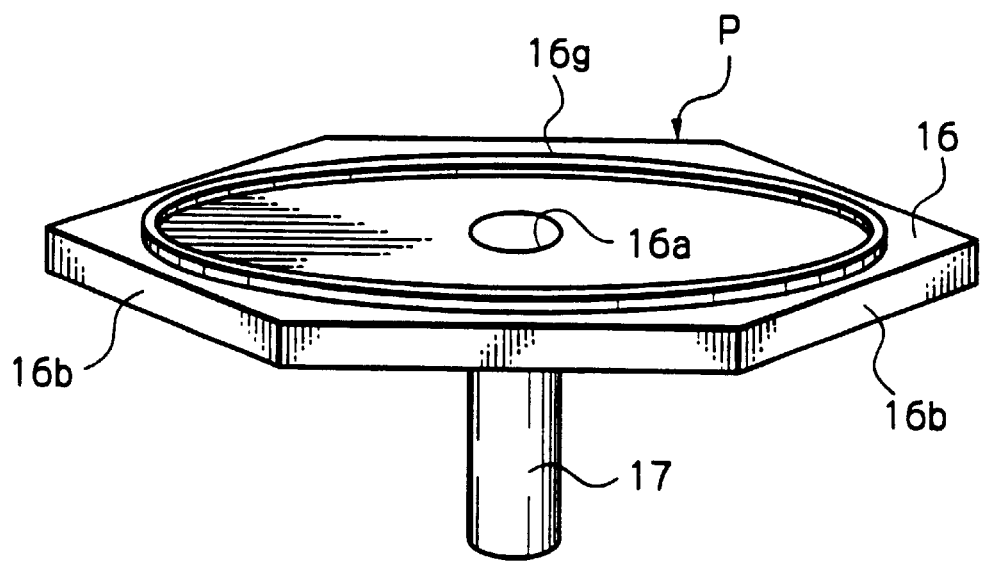

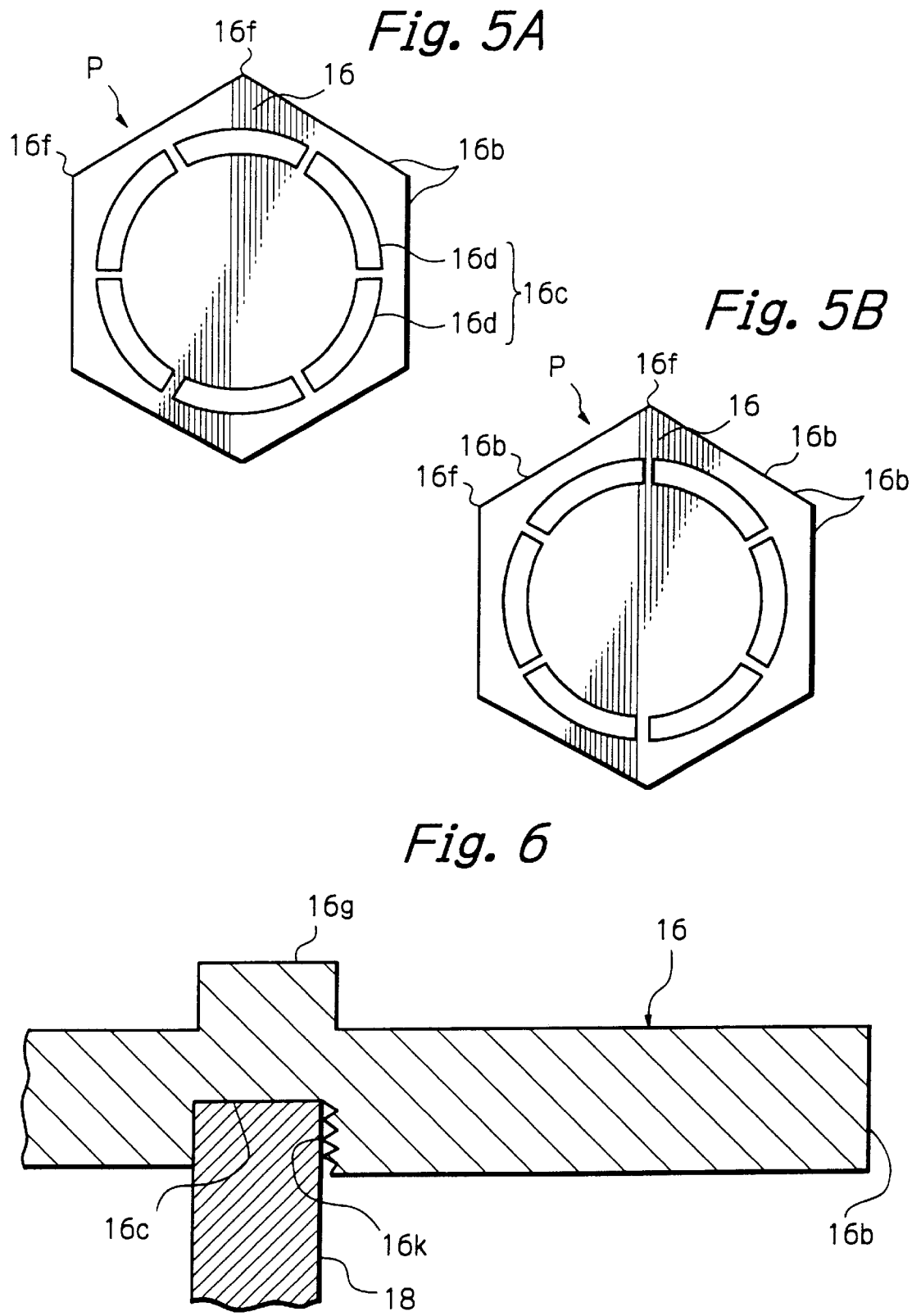

SCANNER USING A POLYGONAL MIRROR

BACKGROUND OF THE INVENTION

The present invention relates to a scanner and more particularly to a scanner of the type included in an electrophotographic copier, laser printer, facsimile apparatus or similar image forming apparatus for steering a light beam with a polygonal mirror.

A conventional scanner of the type described includes a polygonal mirror mounted on a flange and a scanner motor for causing the mirror to rotate. The polygonal mirror in rotation reflects a light beam representative of image information. The problem with this conventional scanner is that it is bulky because the polygonal mirror and scanner motor are physically separate from each other and because the scanner motor cannot be sufficiently reduced in size. The scanner therefore occupies a substantial space when mounted on a laser printer or similar image forming apparatus, obstructing the miniaturization of the entire apparatus.

Japanese, Patent Laid-Open Publication No. 8-62527, for example, teaches a scanner motor constructed to reduce the size of the polygonal mirror. The scanner motor disclosed in this document includes a rotor yoke having hexagonal sides. Chip mirrors each are adhered to one of the hexagonal sides of the rotor yoke, forming a polygonal mirror. The chip mirrors, however, not only increase the number of parts of the scanner, but also need highly accurate adhesion to the rotor yoke. In addition, the chip mirrors are apt to come off or deform after adhesion due to a centrifugal force.

Technologies relating to the present invention are also disclosed in, e.g., Japanese Patent Publication No. 6-40177 and Japanese Patent Laid-Open Publication No. 9-230269.

SUMMARY OF THE INVENTION

It is therefore an object of the present invention to provide a polygonal mirror type scanner needing a minimum number of parts, obviating the need for highly accurate adhesion, durable, and easy to produce.

A scanner using a polygonal mirror of the present invention includes a rotor with a magnet mounted thereon, a rotary shaft on which the rotor is mounted, and a stator with a coil facing the magnet at a preselected distance. The rotor is machined in the form of a square pillar having mirror surfaces at sides thereof to thereby form the polygonal mirror. A recess is formed in one major surface of the rotor while the magnet is press fitted in the recess.

BRIEF DESCRIPTION OF THE DRAWINGS

The above and other objects, features and advantages of the present invention will become more apparent from the following detailed description taken with the accompanying drawings in which:

FIG. 4 is an external perspective view showing a rotor portion included in the illustrative embodiment;

FIGS. 5A and 5B are bottom views each showing a particular modification of a recess formed in the polygonal mirror of the illustrative embodiment;

FIG. 6 is a fragmentary, enlarged sectional view of the polygonal mirror of the illustrative embodiment;

DESCRIPTION OF THE PREFERRED EMBODIMENTS

Figure 1:
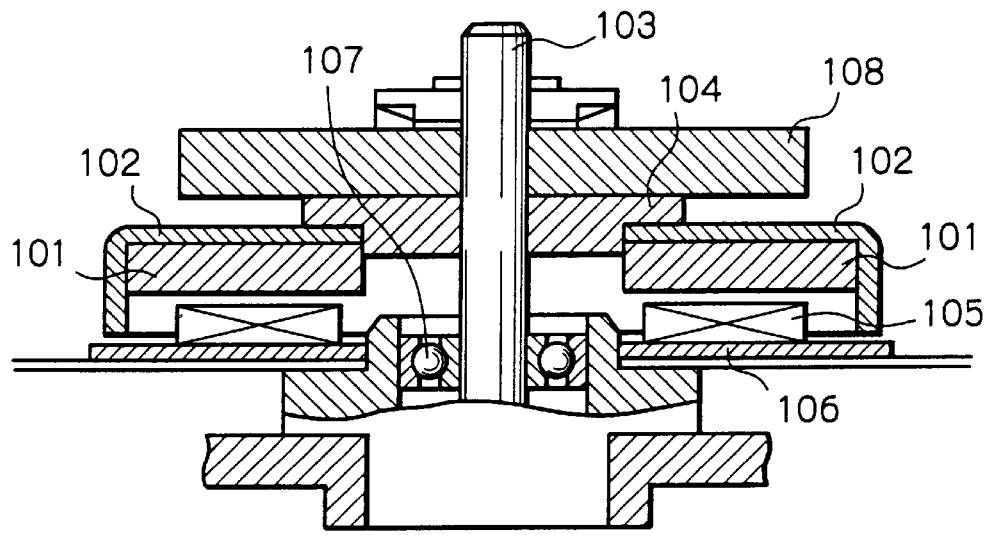
FIG. 1 is a sectional view showing a conventional scanner using a polygonal mirror.

To better understand the present invention, brief reference will be made to a conventional polygonal mirror type scanner, shown in FIG. 1. As shown, the scanner includes a scanner motor generally made up of a rotor portion and a stator portion. The rotor portion includes a rotor yoke 102 with a magnet 101 mounted on the underside thereof, a rotary shaft 103, and a flange 104 via which the rotor yoke 102 is affixed to the shaft 103. The stator portion is made up of a stator yoke 106 with a coil 105 mounted on its top and a bearing 107 rotatably supporting the shaft 103. A polygonal mirror 108 is affixed to the flange 104.

The problem with the above conventional scanner is that it is bulky because the polygonal mirror 108 and scanner motor are physically separate from each other and because the scanner motor cannot be sufficiently reduced in size.

Figure 2:
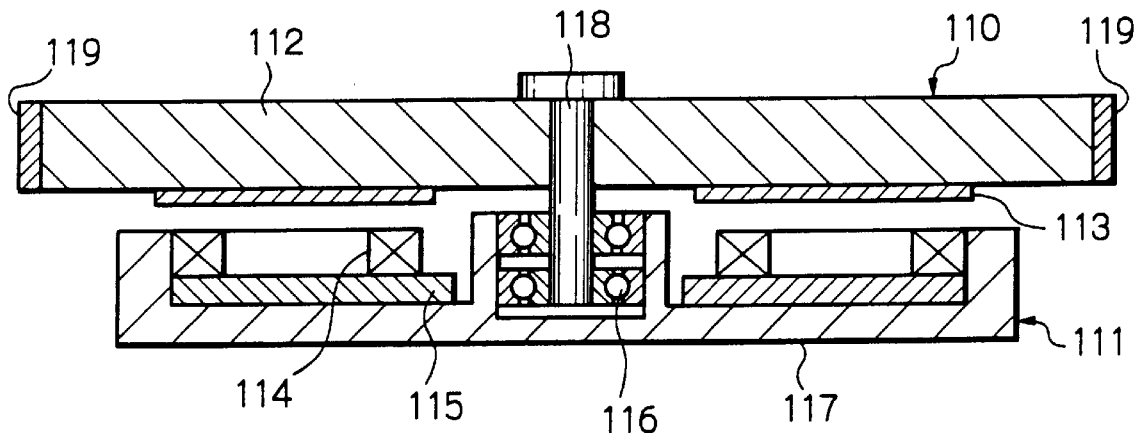
FIG. 2 is a sectional view showing conventional scanner motor for driving a polygonal mirror.

FIG. 2 shows a miniature scanner motor for driving a polygonal mirror and taught in Japanese Patent Laid-Open Publication No. 8-62527 mentioned earlier. As shown, the scanner motor includes a rotor 110 and a stator 111. The rotor 110 is made up of a flat rotor yoke 112 having a hexagonal contour and a permanent magnet 113 mounted on the bottom of the rotor yoke 112. The stator 111 is made up of a flat armature coil 114, a stator yoke 115, a bearing 116, and a housing 117 accommodating them. The armature coil 114 is spaced from the permanent magnet 114 by an axial gap. The bearing 116 rotatably supports a rotor shaft 118.

The rotor yoke 112 plays the role of the base of a polygonal mirror at the same time. Specifically, chip mirrors 119 each are adhered to one of the hexagonal sides of the rotor yoke 112, forming a polygonal mirror. The chip mirror 119 is implemented by aluminum foil with a mirror surface or a mirror formed of glass.

When a DC voltage is applied to the armature coil 114 via a sensor less three-phase bipolar driver, not shown, the rotor yoke 112 of the rotor 110 spins about the rotor shaft 118. While the motor is in rotation, a light beam is issued sideways toward the chip mirrors 119 separate from the rotor yoke 112. As a result, the rotor yoke 112 serves as a polygonal mirror.

Even the scanner shown in FIG. 2 has the previously discussed problems left unsolved.

Figure 3A:
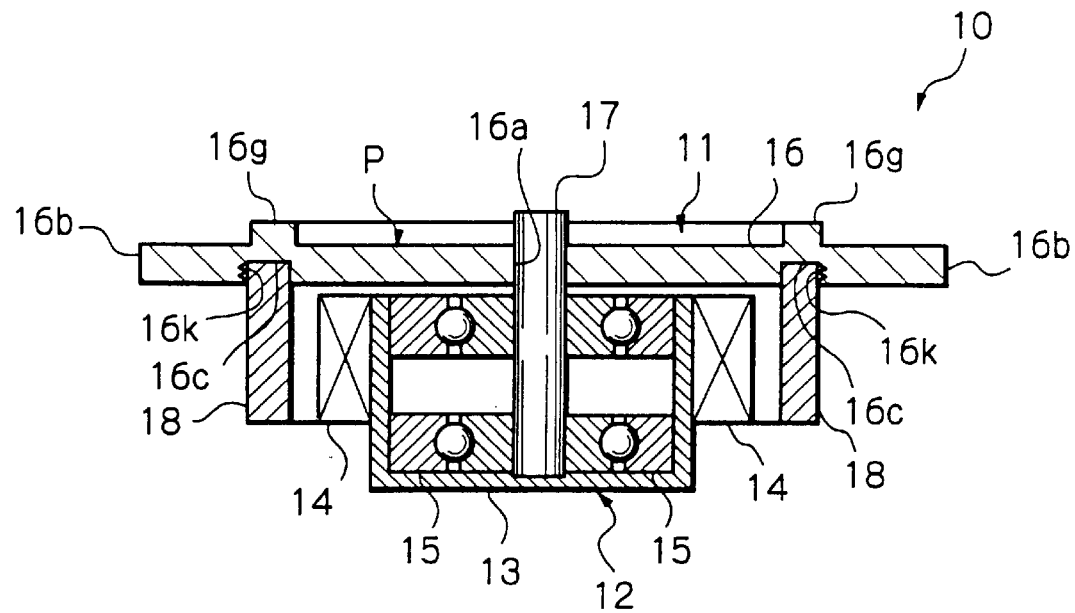
FIGS. 3A and 3B are cross-sectional side elevational views showing a polygonal mirror type scanner having one recess or two recesses, respectively, embodying the present invention.
Figure 3B:
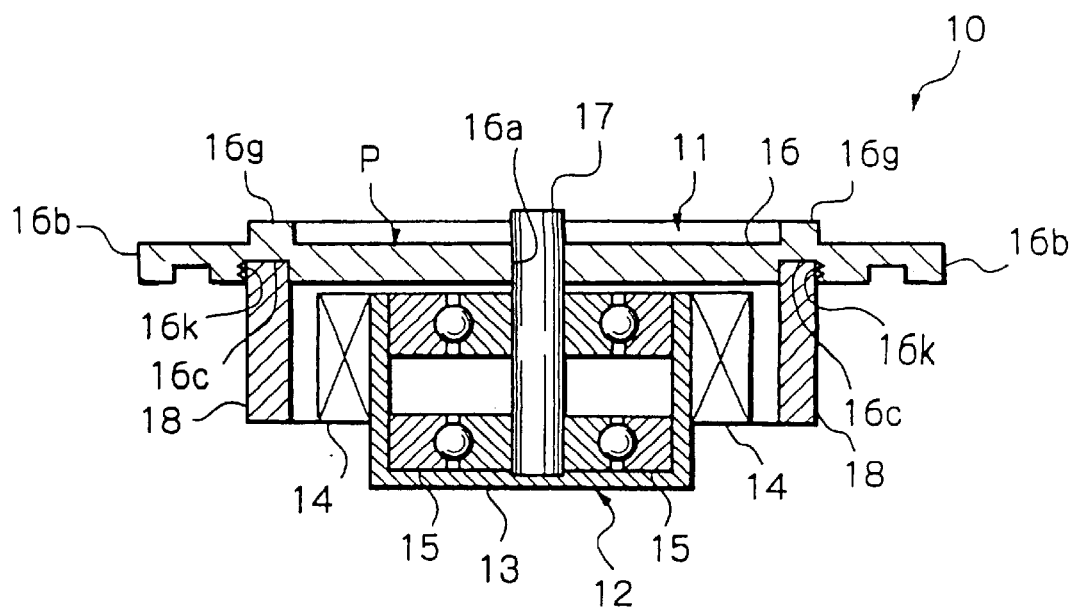

Referring to FIGS. 3A, 3B and 4, a polygonal mirror type scanner embodying the present invention will be described. As shown in FIG. 3A, the scanner, generally 10, includes a brush less DC motor made up of a stator portion 12 and a rotor portion 11. The stator portion 12 has a stator yoke 13, a coil 14 affixed to the circumference of the stator yoke 13, and a bearing 15 disposed in the stator yoke 13.

The rotor portion 11 includes a rotor 16 formed with a center hole 16a in which a shaft 17 is press fitted. The rotor 16 has its circumference ground and polished in a regular polygonal configuration, as seen in a plan view, so as to form mirror surfaces (square pillar sides) 16b. An annular recess 16c is formed in the bottom or one major surface of the rotor 16 while an annular multipolar magnet 18 is press fitted in the recess 16c. The radially outer wall 16k of the annular recess 16c is notched, as illustrated. An annular projection 16g protrudes from the top or other major surface of the rotor 16. The projection 16g has a thickness so selected as not to deform the notched outer wall 16k of the recess 16c when the projection 16g is inserted in the recess 16c, as will be described specifically later.

The rotor portion 11 is rotatably supported by the bearing 15 of the stator portion 15 via the shaft 17. The multipolar magnet 18 and coil 14 face each other in the circumferential direction, constituting a brushless DC motor.

The regular polygonal rotor 16 is formed of aluminum. In the illustrative embodiment, the rotor 16 has a regular hexagonal contour in a plan view, i.e., it has an upper and a lower major surface both of which are regular hexagonal. The circumference of the rotor 16 is ground to form the hexagonal mirror surfaces 16b forming the contour of the rotor 16, thereby constituting a polygonal mirror P. The shaft 17 is press fitted in the center hole 16a of the rotor 16 in the direction perpendicular to the rotor 16. The rotor 16 may, of course, be provided with any suitable regular polygonal contour other than the regular hexagonal contour.

The annular recess 16c formed in the bottom of the rotor 16 is concentric with the center hole 16a and shaft 17. The multipolar magnet 18 is press fitted in the recess 16c. The annular projection 16g protruding from the top of the rotor 16 is also concentric with the center hole 16a and shaft 17. If desired, the recess 16c for receiving the magnet 18 may be formed in the bottom of the rotor 16 concentrically with the center hole 16a and shaft 17.

Referring to FIG. 3B, the scanner 10 is generally the same as the scanner shown in FIG. 3A, except that a second recess 16m is formed between the first recess 16c and the mirror surface 16b. The purpose of the second recess 16m is to absorb an internal stress.

FIGS. 5A and 5B each show a specific modification of the recess 16c included in the polygonal mirror P. In FIG. 5A, the recess 16c is divided into six arcuate portions 16d identical in configuration in the circumferential direction. The centers of the six arcuate portions 16d each correspond to one apex 16f of the mirror P. If desired, the six portions 16d may each be bisected to form twelve portions in total. That is, when the regular polygon has n sides, the recess 16c should preferably be divided by a×n (n being a natural number) from the dynamic balance standpoint.

As shown in FIG. 5B, the arcuate portions 16d may be positioned such that portions between the nearby arcuate portions 16d correspond to the apexes of the mirror P.

As best shown in FIG. 6, the radially outer sidewall 16k of the annular recess 16c is notched, as mentioned earlier. When the multipolar magnet 18 is inserted in the recess 16c, the notched sidewall 16k easily deforms and absorbs the resulting internal stress. This successfully prevents the internal stress from being imparted to the mirror surfaces 16b. The deformation of the sidewall 16k therefore absorbs the force ascribable to press fitting and a centrifugal force acting toward the mirrors 16b and apt to bring about the internal stress.

Th rotor 16 with the mirror surfaces 16 makes it needless to affix mirror chips, films or similar members to the sides of a rotor and thereby reduces the number of parts. In addition, the rotor 16 does not need highly accurate adhesion and is therefore free from the peeling of mirror surfaces ascribable to a centrifugal force.

The polygonal mirror P is miniature because the mirror surfaces 16b are formed by machining the sides of the rotor 16. The mirror P therefore needs a minimum of exclusive space when mounted on a laser printer or similar image forming apparatus, thereby miniaturizing the entire image forming apparatus.

Because the rotor 16 with the mirror surfaces 16b is formed of aluminum, the entire rotor portion 11 is lightweight. This is desirable in the aspect of oscillation and noise.

The annular recess 16c is formed in the bottom of the rotor 16 and allows the magnet 18 to be easily positioned concentrically with the shaft 17. In addition, the magnet 18 and shaft 17 are free from eccentricity. Eccentricity would disturb the dynamic balance and would thereby degrade the jitter characteristic while aggravating oscillation and noise.

Further, the annular recess 16c formed in the bottom of the rotor 16 facilitates the press fitting of the magnet 18 and accurately positions the magnet in the radial direction of the polygonal mirror P. The magnet 18 is therefore prevented from coming off or being dislocated due to a centrifugal force.

The illustrative embodiment with the above mirrors 16b and magnet 18 free from peeling or dislocation achieves high durability. Further, the illustrative embodiment is extremely easy to produce and high quality because the mirror surfaces 16b do not need accurate adhesion and because the magnet 18 is easy to position.

The magnet 18 is press fitted in the rotor 16 having the mirror surfaces 16b. It is therefore likely that the resulting internal stress is imparted to the mirror surfaces 16b or that an internal stress ascribable to a centrifugal force is imparted to the mirror surfaces 16b. The illustrative embodiment solves this problem with the notched outer sidewall 16k intervening between the annular recess 16c and the mirror surfaces 16b. Because the mirror surfaces 16b are free from deformation ascribable to the internal stress derived from press fitting, the magnet 18 can be press fitted in the recess 16c after the finishing of the rotor 16.

A specific procedure for forming the mirror surfaces 16b on the rotor 16 will be described with reference to FIG. 7. As shown, blank pieces p expected to form the polygonal mirrors P, FIGS. 3A and 3B are stacked one upon the other. Each blank piece p includes the annular recess 16c for press fitting the multipolar magnet 18, not shown, and the annular projection 16g protruding upward from the blank piece p. The projection 16g is engaged with the recess 16c of the overlying blank piece p. Therefore, the recesses 16c of the blank pieces p serve to position the pieces p stacked to be machined at the same time.

In the illustrative embodiment, each projection 16g has a greater axial length than each annular recess 16c. In this configuration, the projection 16g of each blank piece p contacts the inner wall of the recess 16c of the overlying blank piece p at its inner wall and contacts the bottom of the recess 16c at its top, positioning the body p axially and radially.

Figure 7:
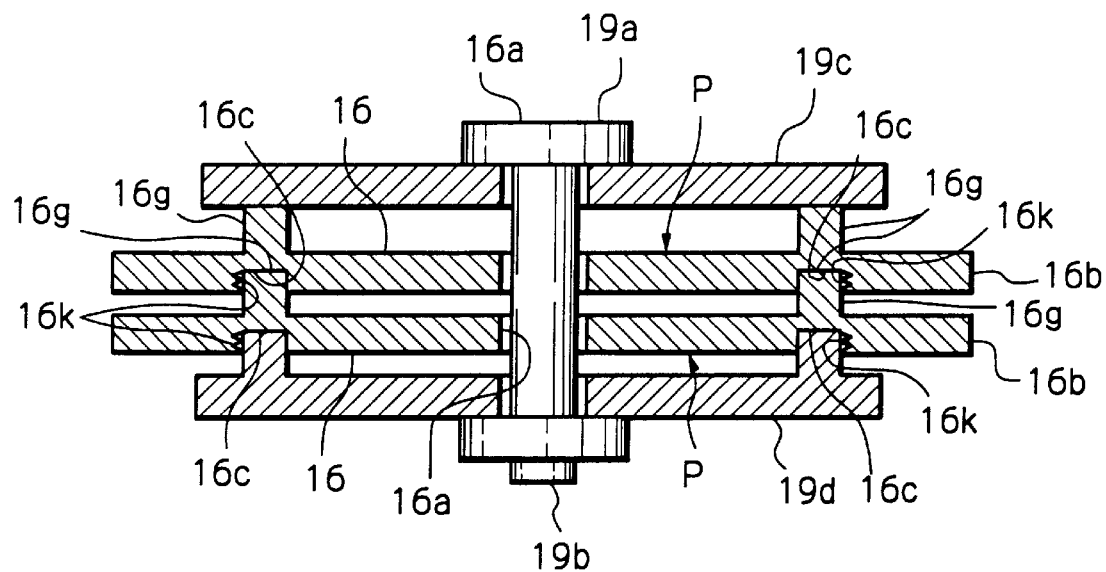
FIG. 7 is a sectional view showing a stack of blank pieces to be machined together to form polygonal mirrors each having the configuration of FIG. 3.

More specifically, as shown in FIG. 7, the blank pieces p stacked together are held between a flat first jig 19c and a second jig 19d. The first jig 19c contacts the top of the projection 16g of the top blank piece p. A projection extending upward from the second jig 19d is received in the recess 16c of the bottom blank piece p. A bolt-like fastening member 19a is inserted in the center holes of the two jigs 19c and 19d and the center holes 16a of the blank pieces p. Subsequently, a nut-like fastening member 19b is fitted on the fastening member 19a to thereby fasten the above stack. In this condition, the circumferences of the blank pieces p can be machined together to form the mirror surfaces 16b. This successfully reduces the number of machining steps and thereby promotes efficient machining.

Another advantage achievable with the stack shown in FIG. 7 is that the fastening means 19a and 19b exert a fastening force on the blank pieces p linearly in parallel to the axis of the stack, freeing the resulting polygonal mirrors from deformation.

While only two blank pieces p are shown in FIG. 7, three or more blank pieces p may, of course, be stacked together.

Figure 8:
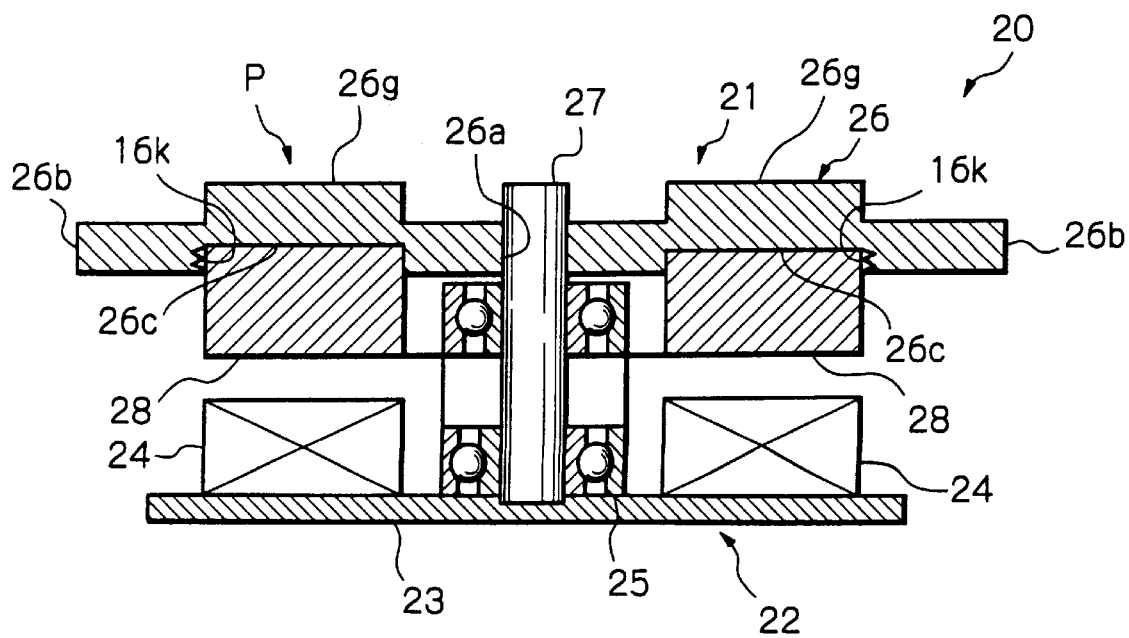
FIGS. 8 and 9 are sectional side elevations each showing a particular alternative embodiment of the present invention.

Reference will be made to FIG. 8 for describing an alternative embodiment of the present invention. As shown, a polygonal mirror type scanner, generally 20, includes a brushless DC motor made up of a stator portion 22 and a rotor portion 21. The stator portion 22 has a stator yoke 23, a coil 24 affixed to the top of the stator yoke 23, and a bearing 25 positioned at the center of the stator yoke 23.

The rotor portion 21 includes a rotor 26 formed with a center hole 26a in which a shaft 27 is press fitted. The rotor 26 has its circumference ground and polished in a regular polygonal configuration, as seen in a plan view, so as to form mirror surfaces (square pillar sides) 26b. An annular recess 26c is formed in the bottom or one major surface of the rotor 26 while an annular multipolar magnet 28 is press fitted in the recess 26c. The radially outer wall 16k of the annular recess 16c is notched, as illustrated. An annular projection 26g protrudes from the top or other major surface of the rotor 26. The rotor portion 21 is rotatably supported by the bearing 25 of the stator portion 22 via the shaft 27. The multipolar magnet 28 and coil 24 face each other in the circumferential direction, constituting a brushless DC motor.

The regular polygonal rotor 26, like the rotor 16, is formed of aluminum. In the illustrative embodiment, too, the rotor 26 has a regular hexagonal contour in a plan view, i.e., it has an upper and a lower major surface both of which are regular hexagonal. The circumference of the rotor 16 is ground to form the mirror surfaces 16b forming the contour of the rotor 16, thereby constituting a polygonal mirror P. The shaft 27 is press fitted in the center hole 26a of the rotor 26 in the direction perpendicular to the rotor 26. Again, the rotor 16 may be provided with any suitable regular polygonal contour other than the regular hexagonal contour.

The annular recess 26c formed in the bottom of the rotor 26 is concentric with the center hole 26a and shaft 27. The magnet 28 is press fitted in the recess 26c. With this configuration, this embodiment operates in the same manner as the previous embodiment and also achieves the advantages stated previously.

Figure 9:
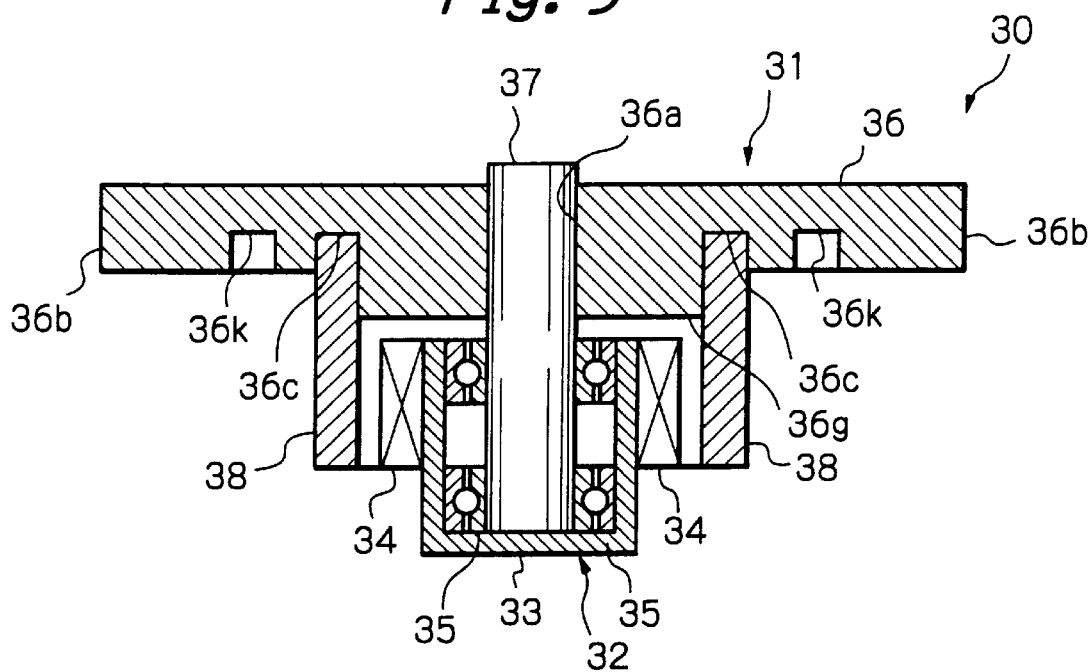

FIG. 9 shows another alternative embodiment of the present invention. As shown, a polygonal mirror type scanner, generally 30, includes a brushless DC motor made up of a stator portion 32 and a rotor portion 31. The stator portion 32 has a stator yoke 33, a coil 34 affixed to the circumference of the stator yoke 33, and a bearing 35 disposed in the stator yoke 33.

The rotor portion 31 includes a rotor 36 formed with a center hole 36a in which a shaft 37 is press fitted. The rotor 36 has its circumference ground and polished in a regular polygonal configuration, as seen in a plan view, so as to form mirror surfaces (square pillar sides) 36b. An annular recess 36c is formed in the bottom or one major surface of the rotor 36 while an annular multipolar magnet 38 is press fitted in the recess 36c. A recess or second recess 36k is formed between the first recess 36c and the mirror surfaces 36b for absorbing an internal stress. A projection 36g protrudes downward from the center portion of the bottom of the rotor 36.

The rotor portion 31 is rotatably supported by the bearing 35 of the stator portion 32 via the shaft 37. The multipolar magnet 38 and coil 34 face each other in the circumferential direction, constituting a brushless DC motor.

The regular polygonal rotor 36 is formed of aluminum. In the illustrative embodiment, too, the motor 36 has a regular hexagonal contour in a plan view, i.e., it has an upper and a lower major surface both of which are regular hexagonal. The circumference of the rotor 36 is ground to form the hexagonal mirror surfaces 36b forming the contour of the rotor 36, constituting a polygonal mirror P. The shaft 37 is press fitted in the center hole 36 a of the rotor 36 in the direction perpendicular to the rotor 36. The rotor 36 may, of course, be provided with any suitable regular polygonal contour other than the regular hexagonal contour.

The annular recess 36c formed in the lower surface of the rotor 36 is concentric with the center hole 36a and shaft 37. The magnet 38 is press fitted in the recess 36c.

In the above scanner 30, the magnet 38 is press fitted in the rotor 36 having the mirror surfaces 36b. It is therefore likely that the resulting internal stress is imparted to the mirror surfaces 36b or that an internal stress ascribable to a centrifugal force is imparted to the mirror surfaces 36b. The illustrative embodiment solves this problem with the second recess 36k intervening between the first recess 36c and the mirror surfaces 36b. Because the mirror surfaces 36b are free from deformation ascribable to the internal stress derived from press fitting, the magnet 38 can be press fitted in the recess 36c after the finishing of the rotor 36.

Figure 10:
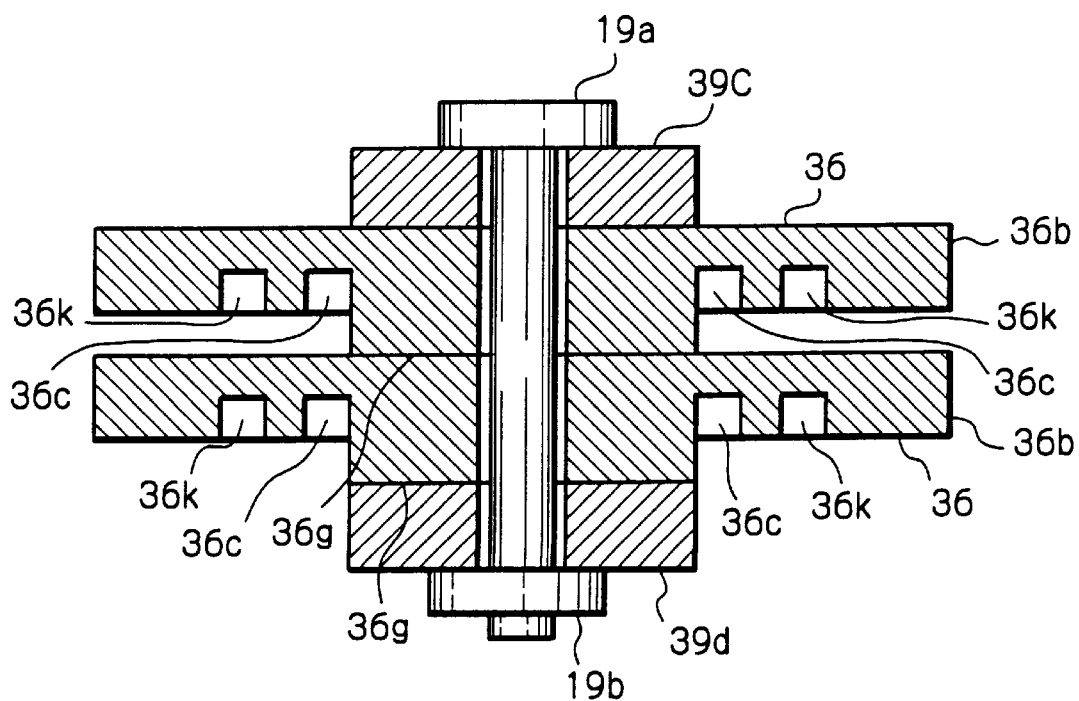
FIG. 10 is a view similar to FIG. 7, showing a stack of blank pieces for forming polygonal mirrors each having the configuration of FIG. 9.

FIG. 10 shows a stack of blank pieces to be ground and polished at the same time for producing polygonal mirrors each having the configuration of FIG. 9. As shown, each blank piece includes the annular recess 36c for press fitting the multipolar magnet 38, not shown, recess 36k for absorbing an internal stress, and the projection 36g protruding downward from the blank piece. The projection 36g rests on the top of the underlying blank piece.

More specifically, as shown in FIG. 10, the blank pieces stacked together are held between a first and a second flat jig 39c and 39d. The first jig 39c contacts the top of the top blank piece at a position corresponding to the projection 36g. The second jig 39d contacts the bottom of the project ion 36g of the bottom blank piece. A bolt-like fastening member 19a is inserted in the center holes of the two jigs 39c and 39d and the center holes 36a of the blank pieces. Subsequently, a nut-like fastening member 19b is fitted on the fastening member 19a to thereby fasten the above stack. In this condition, the circumferences of the blank bodies can be machined together to form the mirror surfaces 36b. This successfully reduces the number of machining steps and thereby promotes efficient machining.

Another advantage achievable with the stack shown in FIG. 10 is that the fastening means 19a and 19b exert a fastening force on the blank pieces linearly in parallel to the axis of the stack, freeing the resulting polygonal mirrors from deformation. In addition, because the rotors 36 do not contact each other, their surfaces are not damaged during machining.

In summary, it will be seen that the present invention provides a polygonal mirror type scanner including a minimum number of parts due to the absence of, e.g., mirror chips separate from a rotor, allowing a magnet to be positioned by a recess, not needing highly accurate adhesion, having high durability, and easy to produce. Further, a plurality of polygonal mirrors can be stacked and machined at the same time while being prevented from being deformed by a fastening force. In addition, A recess or a notched portion prevents an internal stress ascribable to the press fitting of the magnet or a centrifugal force from being imparted to mirror surfaces formed on the rotor.

Various modifications will become possible for those skilled in the art after receiving the teachings of the present disclosure without departing from the scope thereof.

What is claimed is:

1. A scanner including a polygonal mirror, comprising:
   a rotor with a magnet mounted thereon;
   a rotary shaft on which said rotor is mounted; and
   a stator with a coil facing said magnet at a preselected distance;
   wherein said rotor is machined in a form of a square pillar having mirror surfaces at sides thereof to thereby form the polygonal mirror and has a first recess formed in one major surface thereof for press fitting said magnet.

2. A scanner as claimed in claim 1, wherein a second recess is formed in said rotor between said first recess and said mirror surfaces for absorbing an internal stress.

3. A scanner as claimed in claim 1, wherein a radially outer sidewall of said first recess is notched.

4. A scanner including a polygonal mirror, comprising:
   a rotor with a magnet mounted thereon;
   a rotary shaft on which said rotor is mounted; and
   a stator with a coil facing said magnet at a preselected distance;
   wherein said rotor is machined in a form of a square pillar having mirror surfaces at sides thereof to thereby form the polygonal mirror and has a first recess formed in one major surface thereof for press fitting said magnet and has a projection formed on the other major surface for mating with said recess.

5. A scanner as claimed in claim 4, wherein a second recess is formed in said rotor between said first recess and said mirror surfaces for absorbing an internal stress.

6. A scanner as claimed in claim 4, wherein a radially outer sidewall of said first recess is notched.

* * * * *